Patented Dec. 29, 1931

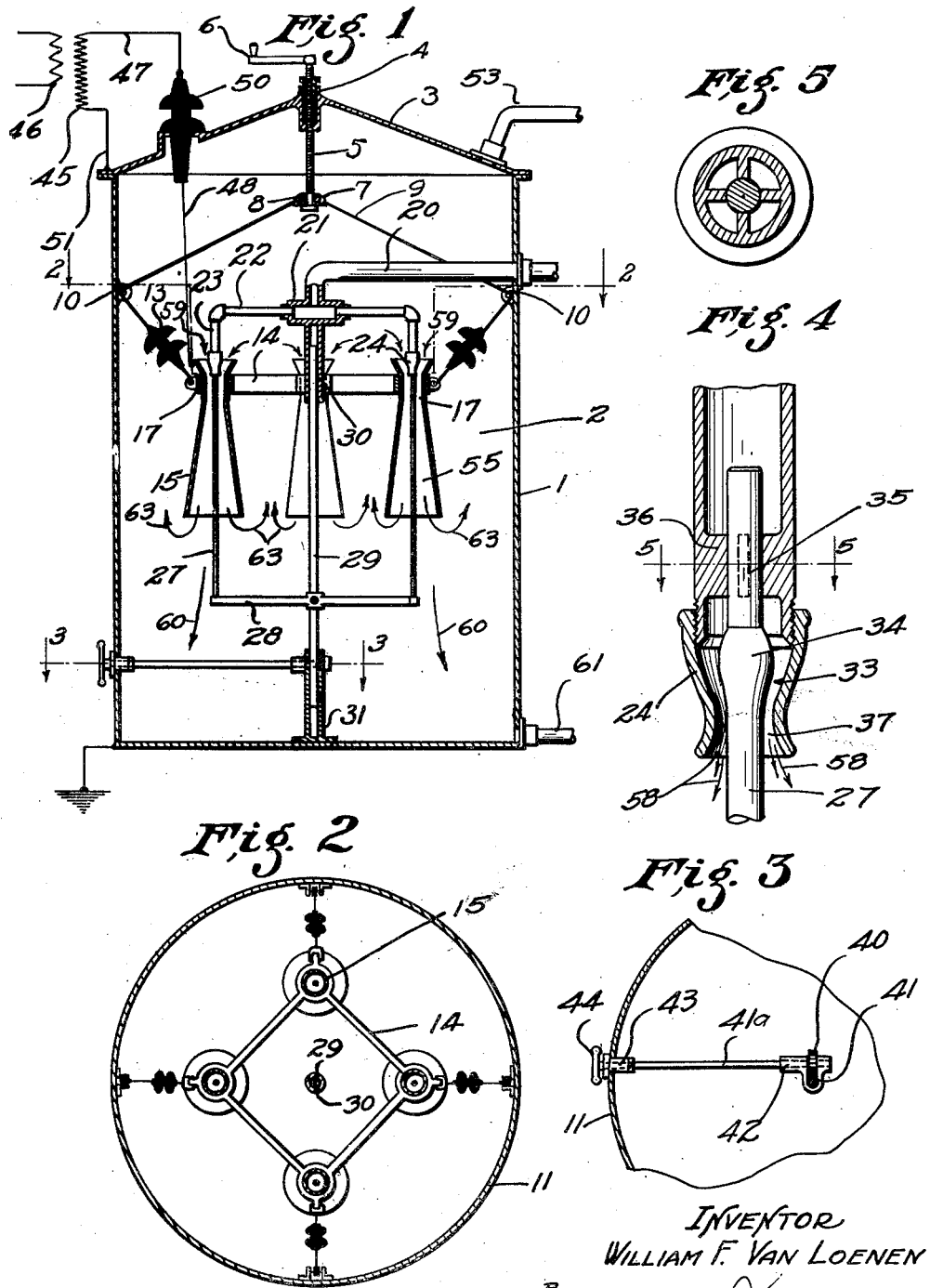

1,838,889

UNITED STATES PATENT OFFICE

WILLIAM F. VAN LOENEN, OF BUENA PARK, CALIFORNIA, ASSIGNOR TO PETROLEUM RECTIFYING COMPANY OF CALIFORNIA, OF LOS ANGELES, CALIFORNIA, A CORPORATION OF CALIFORNIA

EMULSION TREATER

Application filed August 15, 1927, Serial No. 212,991. Renewed July 21, 1930.

This invention relates to treaters for treating a fluid so that the constituents thereof may be separated.

My invention is adapted for treating many types of fluids such as water-in-oil emulsions, and it has a particular utility in the oil-producing industry for treating petroleum emulsion. In the following description I will describe my invention in this use, but it should be understood that I do not thereby limit myself.

The ordinary type of treater used principally in the oil-producing industry consists of a tank in which a pair of electrodes are placed. These electrodes are spaced so as to provide a treating zone and are connected in an electric circuit so that an electric field may be impressed upon the treating zone. Fluid, which in the oil-producing industry, is a water-in-oil emulsion, is introduced into the tank and is passed between the electrodes where it is subjected to the action of the electric field. The electric field acts upon the emulsion in such a manner as to coalesce the dispersed phase or the water particles into masses of such a size that they will gravitate from the oil. Certain types are inefficient for the reason that water particles tend to chain up between the electrodes, thus forming short-circuiting paths. Electricity will then flow across the treating space and the strength of the electric field will be greatly reduced. It will be understood that when the electric field is reduced in strength, the treating action is also reduced. It has been found that a chaining action betwen the electrodes may be eliminated if a dielectric barrier is formed in the treating space, this dielectric barrier preventing the water particles form lining up. It has been found that a very satisfactory dielectric barrier may be provided by circulating a relatively dry oil around one of the electrodes and through the treating space. For a full description of this process see the applications of Harmon F. Fisher entitled Dehydrator with high field intensity grounded electrode, filed September 16, 1926, Serial No. 135,804, and Dehydrator with means for directing emulsion through high intensity field, filed July 2, 1927, Serial No. 203,253. A satisfactory way of circulating the barrier is to utilize the injector action of the incoming emulsion which is directed into the treating space for treatment. In view of the fact that different emulsions treat at different rates of speed it is desirable to provide a treater with a means for adjusting the flow of the incoming emulsion.

It is one of the objects of this invention to provide a treater in which the rate of flow of the fluid introduced into the treating space may be regulated.

A further object of the invention is to provide a treater of this character in which the regulation of the flow of incoming fluid is accomplished by moving one of the electrodes.

A further object of the invention is to provide a treater in which the flow of the liquid forming the dielectric barrier may be regulated.

Other objects and advantages of the invention will be made evident hereinafter.

Referring to the drawings in which I illustrate a preferred form of the invention:

Fig. 1 is a vertical cross section.

Fig. 2 is a horizontal cross section taken on the line 2—2 of Fig. 1.

Fig. 3 is a fragmentary cross section taken on the line 3—3 of Fig. 1.

Fig. 4 is an enlarged fragmentary section of one of the nozzles of the invention.

Fig. 5 is a section taken on the line 5—5 of Fig. 4.

Referring to the drawings in detail the invention has a shell 1 providing a chamber 2. The shell 1 has a tight cap 3 provided at the center thereof with a stuffing box 4. Passing through and threadedly engaging the body and gland of the stuffing box 4 is a threaded jack shaft 5 which has a handle 6 at its upper end and a swivel head 7 rotatably provided on its lower end. Secured to ears 8 formed on the swivel head 7 is the central portion of a flexible member formed of a plurality of flexible cables 9 which pass around fixed pulleys 10 mounted on the inner surface of the shell 1 and connect to insulators 13 which are in turn connected to and support a frame 14. The frame 14 acts as a support for a plurality of primary or live electrodes 15. These live electrodes 15 are open at both ends so as to provide a passage which forms a treating space. Near the upper end of the live electrodes 15 are constrictions 17 which assist the injector effect of the incoming emulsion as will be explained later.

Extending into the shell 1 is an emulsion supply pipe 20 having a head 21. Extending from the head 21 are arms in the form of pipes 22, the outer ends 23 of which are directed downward and have nozzles 24 at the outer ends thereof. As illustrated best in Fig. 5 the nozzles 24 are located in the upper ends of the live electrodes 15 immediately above the constrictions 17. The nozzles 24 are concentric with respect to the live electrodes 15.

Extending concentrically through the live electrodes and cooperating therewith to define treating zones are secondary or grounded electrodes 27. The grounded electrodes 27 are supported by a standard consisting of a cross-shaped member 28 which is supported by a vertical guide 29. The upper end of the vertical guide 29 is slidably held in a sleeve 30 which is formed on the lower part of the head 21, and the lower end of the guide 29 is supported by a sleeve 31 at the bottom of the shell 1. As illustrated in Fig. 4 the upper end of each of the grounded electrodes 27 extends into one of the nozzles 24 and has a valve 33 formed on the upper end thereof. The valve 33 includes an enlarged portion 34 and an upper cylindrical guide portion 35. The guide portion 35 of each valve extends inside webs or vanes 36 formed in each of the portions 23 of the pipes 22, whereby the upper ends of the grounded electrodes 27 and the valves 33 are centralized. It will be seen that by moving the grounded electrodes downward the passages 37 of the nozzles 24 will be closed, and by moving the grounded electrodes 27 upward they will be increased in size.

The movement of the grounded electrodes 27 is accomplished by means of a gear 40 which is adapted to engage a rack 41 formed on the lower end of the vertical guide 29. The gear 40 is carried on a horizontal shaft 41a supported at the inner ends by bearings 42, these bearings 42 being formed integrally with the guide 29. The outer end of the shaft 41a extends through a stuffing box 43 carried by the shell 1 and has a manipulating handle 44 formed on the outer end thereof whereby the shaft 41a may be rotated.

The live and grounded electrodes 15 and 27 are connected to a secondary winding 45 of a transformer 46. A conductor 47 is connected to the secondary winding 45 and to the frame 14 which supports the live electrodes 15 by means of a flexible conductor 48 which extends through an insulator bushing 50. The other side of the secondary winding 45 is connected by a conductor 51 to the shell 1 and is indirectly connected to the grounded electrodes 27.

The operation of the device is as follows:

Before passing any emulsion into the treater it is desirable to fill the treater with a dry oil. This may be accomplished by sending the dry oil through the emulsion inlet pipe 20 or through a separate pipe such as a pipe 53 connected to the cover 3. When the treater has been filled with dry oil the transformer 46 is energized and electric fields are established in the treating spaces 55 provided inside the live electrodes 15. Emulsion is then supplied to the treater through the pipe 20, this emulsion passing through the head 21 and the arms 22. The emulsion is introduced into the upper end of the treating spaces 55 by means of the nozzles 24. This emulsion is directed downward along the grounded electrodes 27 in contact therewith substantially as indicated by arrows 58 of Fig. 4. When this emulsion passes through the constrictions or necks 17 an injector effect is created which draws the dry oil into the ends of the live electrodes as indicated by arrows 59. This dry oil surrounds the emulsion and effectively provides a self-healing dielectric barrier around it and inside the live electrode 15. The emulsion when passing through the treating spaces 55 is subjected to the action of the electric field, and the water particles are coalesced into masses of water of sufficient size to separate from the oil. The treated emulsion which consists of oil and water, which may be separated by allowing it to stand, passes to the bottom of the shell 1, as indicated by arrows 60, and may be withdrawn through a pipe 61. The oil which is practically free from water passes from the lower ends of the live electrodes 15 and rises in the chamber 2 as indicated by arrows 63. This oil is thereafter drawn into the upper ends of the live electrodes 15 and again forms a dielectric barrier in the treating spaces 55. When it is desired to change the rate of flow of the emulsion the handle 44 is manipulated. The shaft 41a is rotated and the vertical guide 29 raised or lowered by the engagement of the gear 40 with the rack 41. The grounded electrodes move with the vertical guide 29. If the vertical guide 29 is moved upward the grounded electrodes 27 are also moved upward and the valves move away from the mouths of the nozzles 24, thus enlarging the passages 37 and increasing the flow of emulsion through the treating spaces 55. If the handle 44 is moved in an opposite direction the valves 33 are lowered so that the passages 37 are reduced in size, thus reducing the flow of the emulsion through the treating spaces 55.

An important part of the invention, as has been carefully pointed out in the foregoing description, is the regulation of the flow of emulsion through the treating spaces 55. The construction shown is very desirable in a number of different ways. In the first place, it is desirable to have the grounded electrodes 27 extend into the nozzles 24 so that the emulsion may readily flow along them. For this reason the valves 33 have been formed integrally with the grounded electrodes 27. Another advantage fo the invention is the simple manner of regulating the position of the valves 33, this being done by a simple manipulation of the handle 44. By reason of the invention is is possible to regulate the flow of emulsion to suit each particular type of emulsion and the best efficiency can be obtained from the treater. Not only is it desirable to change the flow of emulsion because of the different treating periods required for different emulsions but it is also desirable to change the rate of flow so as to either increase or decrease the injector action which, of course, varies the flow of the dielectric barrier through the treating spaces 55.

Besides controlling the rate of flow of the emulsion it is also important to control the rate of flow of the dielectric oil through the live electrodes 15. This is accomplished by rotating the jack shaft 5 by the crank 6. As the stuffing box 4 maintains the shaft 5 in alignment with the axis of the shell 1, the cables 9 are equally tightened or slacked according as the shaft 5 is raised or lowered. This raises or lowers the frame 14 and decreases or increases the space between the nozzles 33 and the restricted necks 17 of the electrodes 15. In this manner the exact proportion of dielectric oil to emulsion may be obtained to secure the maximum effectiveness of the field between the electrodes 15 and 27 without permitting any flashing over.

It should be understood that the utility of my treater is not limited to treating emulsions, this use being only illustrative, but many other fluids which could not be classed as emulsions could be put through the treater described to accomplish various advantages such as separating constituents, etc. Thus, I do not wish to be limited to the use of emulsions.

I claim as my invention:

1. A treater comprising: a primary electrode providing a treating space; a secondary electrode extending into said treating space; fluid supply means for supplying fluid to said treating space; and means extending into the fluid-supply means and movable relative thereto by a movement of one of said electrodes for regulating the flow of said fluid.

2. A treater comprising: a shell providing a chamber; a support carried in said shell; a plurality of live electrodes carried by said support, said live electrodes being open at both ends; a standard; means for moving said standard in a direction parallel to the axes of said live electrodes; a plurality of grounded electrodes, said grounded electrodes being carried by said standard and extending through said live electrodes; an inlet pipe; a plurality of nozzles carried by said inlet pipe, one of said nozzles being located near the upper end of each of said live electrodes; and a valve supported by the upper end of each of said grounded electrodes, said valves being adapted to regulate the size of the opening of each of said nozzles.

3. A treater comprising: a shell adapted to contain a dielectric fluid; a primary electrode; a support for said primary electrode; means for moving said support relative to said shell to vary the position of said primary electrode; a secondary electrode in spaced relationship relative to said primary electrode; a nozzle adapted to direct a fluid to be treated into the space between said electrodes in a manner to draw a portion of said dielectric fluid into the space between said electrodes; and means for moving said secondary electrode relative to said shell to control the flow of fluid through said nozzle.

4. A combination as defined in claim 3 in which said secondary electrode extends into said nozzle.

5. A treater comprising: a shell; a primary electrode structure in said shell; a flexible member secured to said primary electrode structure; pulleys secured to said shell around which said flexible member extends; means engaging the central portion of said flexible member in a manner to move this central portion and thus move said primary electrode structure; and a secondary electrode structure in spaced relationship relative to said primary electrode structure.

6. A treater comprising: a shell; a primary electrode structure in said shell; a shaft extending through said shell and movable relative thereto; a swivel head carried by said shaft; pulleys carried by the outer walls of said shell; a plurality of flexible cables secured to said swivel head and passing around said pulleys, said flexible cables supporting said primary electrode structure; and a secondary electrode structure in spaced relationship relative to said primary electrode structure.

7. In a treater, the combination of: a primary electrode; a secondary electrode; a nozzle for supplying fluid to be treated to the space between said electrodes; and a valve on said secondary electrode and cooperating with said nozzle to control the stream of said fluid supplied to said space between said electrodes.

8. A treater comprising: a pair of electrodes positioned in a body of dielectric material and defining a treating zone; a nozzle means for introducing the fluid to be treated into said treating zone in a manner to draw a portion of said dielectric material therein; and means for changing the relative positions of said treating zone and said nozzle means to control the flow of said dielectric material into said treating zone.

9. In a treater, the combination of: a shell containing a dielectric fluid; primary and secondary electrodes defining a treating zone; a nozzle supplying fluid to be treated to said treating zone in a manner to draw a portion of said dielectric fluid into said treating zone; means operable from the outside of said shell for changing the relative positions of said nozzle and said treating zone to vary the flow of said dielectric fluid into said treating zone; and means cooperating with said nozzle and operable from the exterior of said shell for varying the flow of said fluid into said treating zone.

10. In a treater, the combination of: a shell containing a dielectric fluid; means for establishing an electric field in said shell; means for introducing the fluid to be treated into said electric field in a manner to draw a portion of said dielectric fluid thereinto; means operable from the exterior of said shell for varying the flow of dielectric fluid into said electric field; and means operable from the exterior of said shell for varying the flow of the fluid to be treated into said electric field.

11. A treater comprising: a sleeve-shaped electrode positioned in a dielectric fluid; nozzle means directed axially into said sleeve-shaped electrode but insulated therefrom whereby an electric field may be established therebetween; means for delivering a fluid to said nozzle means, said nozzle means injecting said fluid into said sleeve-shaped electrode in a manner to draw into said sleeve-shaped electrode and around said stream of fluid an envelope of said dielectric fluid; and means for changing the relative axial positions of said nozzle means and said sleeve-shaped electrode to vary the flow of said dielectric fluid into said sleeve-shaped electrode 12. A treater comprising: a shell containing a dielectric fluid; a primary sleeve-shaped electrode in said shell; a movable support for said sleeve-shaped electrode; a secondary electrode extending into said sleeve-shaped electrode; a nozzle directing a fluid into the space between said electrodes and drawing a portion of said dielectric fluid into said space around said fluid; and means for moving said support to move said sleeve-shaped electrode axially with respect to said nozzle to vary the flow of said dielectric fluid into said sleeve-shaped electrode.

13. In a treater the combination of: a tank containing a liquid of different dielectric strength at different sections of said tank; a sleeve-shaped electrode movably supported in said tank, means for drawing into one end of said sleeve-shaped electrode and circulating therethrough a portion of said liquid; and means for moving said sleeve-shaped electrode in said tank whereby said end thereof may be made to communicate with that portion of said liquid having the desired dielectric strength.

14. In a treater the combination of: a primary electrode providing a treating space; a secondary electrode extending into said treating space, nozzle means directed into said treating space for directing a fluid therein; and valve means operable as a function of the relative positions of said secondary electrode and said nozzle and regulating the flow of said fluid set up by said nozzle.

In testimony whereof, I have hereunto set my hand at Los Angeles, California, this 9th day of August, 1927.

WILLIAM F. VAN LOENEN.